PUSH-PUSH LOWER FREQUENCY PUMPED MASER

Filed Oct. 22, 1962 4 Sheets-Sheet 1

INVENTOR
Wayne E. Hughes
BY Ernest P. Klipfel
ATTORNEY

Oct. 5, 1965 W. E. HUGHES 3,210,674

PUSH-PUSH LOWER FREQUENCY PUMPED MASER

Filed Oct. 22, 1962 4 Sheets-Sheet 2

Oct. 5, 1965 W. E. HUGHES 3,210,674

PUSH-PUSH LOWER FREQUENCY PUMPED MASER

Filed Oct. 22, 1962 4 Sheets-Sheet 3

3,210,674

PUSH-PUSH LOWER FREQUENCY PUMPED MASER

Wayne E. Hughes, Laurel, Md., assignor to Westinghouse Electric Corporation, Pittsburgh, Pa., a corporation of Pennsylvania Filed Oct. 22, 1962, Ser. No. 232,060
6 Claims. (Cl. 330—4)

The present invention relates generally to a device for the microwave amplification by stimulated emission of radiation, commonly known as a maser, and more particularly a maser having a preselected arrangement of energy levels allowing the use of a pump frequency considerably lower than the signal frequency.

There is a need in the microwave field for a low noise microwave amplifier to operate in the millimeter wavelength region. It has been demonstrated that maser amplifiers can fill this need, however, there has been one very definite disadvantage. The disadvantage being that the pump frequency, for C.W. operation, must be greater than the signal frequency. To operate in the millimeter range would require a pump tube of considerable power at frequencies above 100 kilomegacycles. Since it is much easier to obtain tubes at the lower frequencies, it is desirable to have a maser capable of being pumped at a lower frequency than the signal frequency.

F. R. Arams, in an article entitled, "Maser Operation With Signal Frequency Higher Than the Pump Frequency," in the Proceedings of the IRE, volume 48, page 108 (1960), reported the successful operation of the solid state maser utilizing the four Zeeman levels of $Cr^{3+}$ in ruby with a signal frequency slightly higher than the pump frequency. However, his method required a harmonic coupling coefficient which is very difficult to determine and is very dependent upon paramagnetic ion concentration.

United States Letters Patent No. 2,909,654, issued to N. Bloembergen, October 20, 1959, entitled, "Uninterrupted Amplification Key Stimulated Emission of Radiation From a Substance Having Three Energy States," suggests multiple transition arrangements for providing maser action at a frequency higher than that of the driving power. Amplification at a frequency which is higher than either of those used for driving is obtained by making the transition frequency of two adjacent levels equal to two non-adjacent levels. Bloembergen depends upon the relaxation rates between levels E4 and E3 being greater than that between levels E3 and E2 or E3 and E1.

A maser in accordance with the present invention provides a much more straightforward and easier manner of operation at signal frequencies higher than pump frequency than previous schemes. Namely, a maser is provided having at least five different energy levels; the separation between the first and third energy levels, second and fourth and third and fifth being equal to the pump frequency. A maser having five or more energy levels may be used so long as the disposition of energy levels is such that at least three transition frequencies are simultaneously equal and extend between non-adjacent energy levels. If the separation between the first and second energy levels is chosen to be greater than the separation between the second and third energy levels, then amplification occurs between levels 5 and 2. If the separation between the first and second energy levels is chosen to be less than the separation between the second and third energy levels, then amplification will occur between levels 4 and 1.

Therefore, an object of the present invention is to provide a maser having a preselected arrangement of energy levels allowing at least three levels to be pumped directly and simultaneously with the same pump frequency which is considerably lower than the signal frequency.

Another object of the present invention is to provide a maser having at least five energy levels wherein at least three transition frequencies to be saturated are made simultaneously equal with each extending between non-adjacent energy levels.

Further objects and advantages of the present invention will be readily apparent from the following detailed description taken in conjunction with the drawing, in which.

Figure 1:
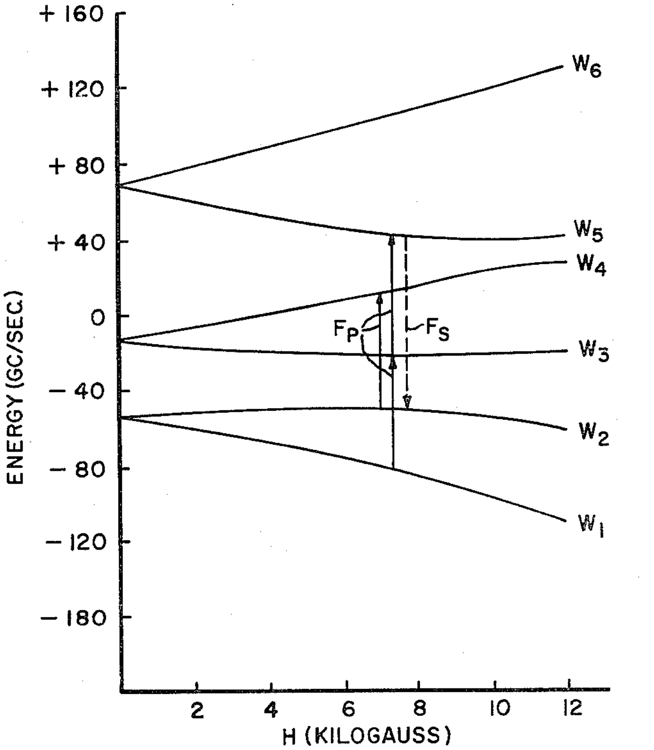
FIGURE 1 is an energy level diagram presented for a better understanding of the present invention.

Generally, a maser is provided having at least five energy levels disposed in such a manner that three levels can be pumped simultaneously with the same pump frequency to obtain the necessary population inversion. Then suppression of all the signal frequencies except one is obtained by providing a resonant cavity solely for the selected one frequency to be amplified; the resonant cavity in the instant illustrative embodiment being formed by the material itself.

Various materials may be utilized to provide the preselected arrangement of energy levels. Successful operation has been obtained by using $Fe^{3+}$ ions in a single crystal host of titanium dioxide ($Fe^{3+}$, $Ti^{4+}O_2$) referred to as rutile. Of course, other materials exhibiting similar characteristics such as for example $Fe^{3+}$ ions in a host of kyanite ($Al_2SiO_5$) or beryl may be used.

It has been shown by D. L. Carter and A. Okaya, "Physical Review," June 15, 1960, pages 1485–1940 that the Spin Hamiltonian which describes the six lowest spin states in a magnetic field of an $Fe^{3+}$ which replaces the $Ti^{4+}$ ion in the rutile structure, is of the form $$H=\frac{g\beta}{h}HS+D\left(S_z^2-\frac{35}{12}\right)+E(S_x^2-S_y^2)+$$

$$\frac{a}{6}\left(S_x^4+S_y^4+S_z^4-\frac{707}{16}\right)+\frac{7}{36}F\left(S_z^4-\frac{95}{14}S_z^2+\frac{81}{16}\right)$$

wherein the value of the derived constants are given as:

$D$=20.35±0.1 kilomegacycle per second
$a$=1.1±0.2 kilomegacycle per second
$E$=2.21±.07 kilomegacycle per second
$F$=−0.5±0.3 kilomegacycle per second
$g$=2.000±.005.
$\beta$ is the Bohr magneton=$-9.271\times10^{-21}$ erg/gauss
$h$ is the Planck's constant=$6.623\times10^{-23}$ erg-sec.
H is the direct current magnetic field given in kilogauss.

Expanding the Hamiltonian into the determinants, numerical solutions are obtained as a function of the two angles of orientation ($\theta$, $\phi$) and the applied magnetic field H.

The angles $\theta$ and $\phi$ specify the direction of the direct current magnetic field with respect to the following set of axis in the rutile host:

$\theta$=the angle between the magnetic field H and the Z axis, in this case the [110] axis.

$\phi$=the angle between the projection of the magnetic field H on the (110) plane and the $x$ axis, in this case the [110] axis.

It has been found that ions can enter the rutile structure in two non-equivalent but equally probable sites. The same Spin Hamiltonian and derived constants can be used for both sites if a new $\theta=\theta(P)$ and $\phi=\phi(P)$ is defined as follows:

$$\text{Tan } \theta(P)=\tan \theta \sin \phi$$
$$\text{Cos } \phi(P)=\sin \theta \cos \phi$$

The difference between the sites is caused by the fact that the local field that surrounds an ion in site A is rotated by 90° from that which surrounds an ion in site B. The ions in either site may be utilized with one site or the other requiring more pump power for successful operation.

The material used for the maser was the ion, $Fe^{3+}$ in a host of $TiO_2$ (rutile). The sixfold, $$S=\frac{5}{2}$$

degenerate states split into three Kramer's doublets which are further split when a constant magnetic field is applied providing six energy levels as shown in FIG. 1. From that figure, all of the transitions that need to be pumped are at the same frequency thus they can be investigated easily and independently using one pump frequency $F_p$. Stimulated emission is illustrated with the signal frequency $F_s$ equal to $F_{52}$. However, as discussed more fully hereinafter stimulated emission can also take place at the signal frequency $F_s$ equal to $F_{41}$.

FIGURE 1 illustrates the energy levels with the angle $\theta$ between the magnetic field H and the Z axis equal to 53° and the angle $\phi$ between the projection of the magnetic field H on the XY plane and the X axis equal to 28.5°. It can be seen from the energy levels of FIG. 1 that at substantially 7.35 kilogauss magnetic field the differences between energy levels $W_3-W_1$, $W_4-W_2$, $W_5-W_3$ are all equal.

Figure 2A:
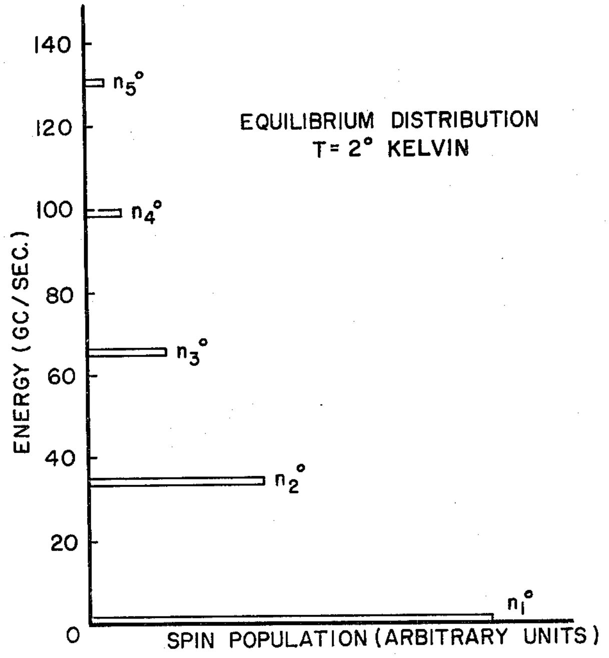
FIGS. 2A and 2B are population distribution graphs for the operation of the present invention under particular conditions.
Figure 2B:
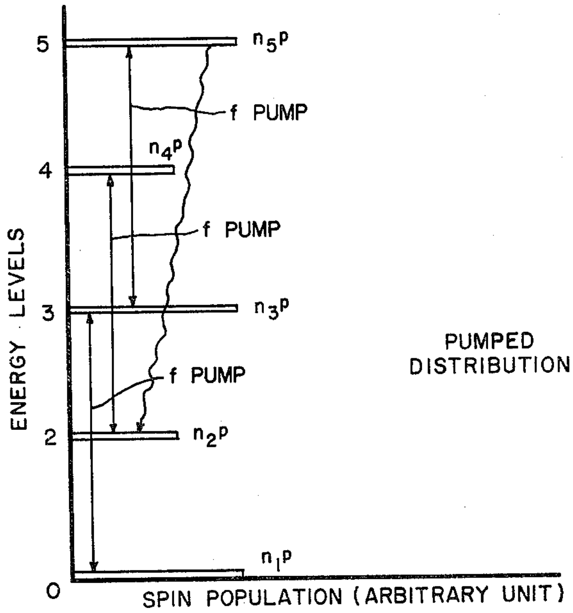

A population distribution graph at a temperature equal to 2° Kelvin and of equilibrium distribution is illustrated in FIGURE 2A. The usual decreasing spin population for the higher energy levels is shown therein. If sufficient pump power is applied to saturate the pump transitions by supplying $f_{13}=f_{24}=f_{35}=f_{pump}$ then the pumped distribution of the energy levels will be as shown in FIGURE 2B. Saturation of the pump transitions makes the population of levels 1, 3 and 5 equal ($N_1=N_3=N_5$) and the population of the second level equal to the population of the fourth level ($N_2=N_4$). It can be seen that the following conditions can exist: $N_5$ greater than $N_2$ or $N_2$ greater than $N_5$ or $N_2$ equal to $N_5$. If the relaxation rates between levels are nearly equal and if $2f_{12}$ is greater than $f_{13}$, then levels 5–4, 3–2 and 5–2 will be inverted and stimulated emission can take place at either $f_{32}$, $f_{54}$ or $f_{52}$. The signal frequencies $f_{32}$ and $f_{54}$ are suppressed in a manner to be described hereinafter. Therefore, the signal frequency $f_s$ has been selected from FIGURE 2B to be equal to $f_{52}$.

If the population density of energy state 2 is made greater than the population density of state 5 ($N_2$ greater than $N_5$) then stimulated emission can take place at $F_{41}$ which is still higher in frequency than the pump frequency. A most unlikely case in most materials is having the population density of state 2 equal to the population density of state 5 wherein no stimulated emission can take place because all the levels are equally populated. Because of the extreme unlikelihood of such an occurrence this situation may be ignored.

The foregoing conditions can be determined from the following calculations of the rate equations for the distribution of the spin system. The generalized rate equations can be written as $$\frac{dn_i}{dt}=\sum_j(\omega_{ji}n_j-\omega_{ij}n_i)+\sum_j W_{ij}(n_j-n_i)$$

where $n_i$ is the number of spins in the $i$th state, $\omega_{ij}$ is the spin lattice relaxation rates between levels $i$ and $j$, and $W_{ij}$ is the radiation induced transition rates. If $\omega_{ij}=\omega_{ji}$ exponent $(-hf_{ij}/kT)$ for $j$ greater than $i$ where $f_{ij}$ is the transition frequency, $h$ is Planck's constant, $k$ is Boltzmann's constant and T is the bath temperature, then for the five level maser scheme when $hf_{ij}/kT$ is much less than unity the foregoing equation can be simplified as follows:

$$\frac{dn_2}{dt}=\omega_{21}\left(n_1-n_2-\frac{N}{5}\frac{h}{kT}f_{12}\right)+\omega_{32}\left(n_3-n_2+\frac{N}{5}\frac{h}{kt}f_{23}\right)$$
$$+\omega_{42}\left(n_4-n_2+\frac{N}{5}\frac{h}{kT}f_{42}\right)+\omega_{52}\left(n_5-n_2+\frac{N}{5}\frac{h}{kT}f_{52}\right)$$
$$+W_{42}(n_4-n_2)+W_{52}(N_5-N_2)$$

In the above equation $N=n_1+n_2+n_3+n_4+n_5$ and at equilibrium at a temperature of 2° Kelvin $$\frac{dn_2}{dt}=0$$

For the five level maser operation, the condition that $f_{13}=f_{35}=f_{24}=f_{pump}$ is necessary and with saturated equilibrium pump power the spin populations $$n_1=n_3=n_5 \text{ and } n_2=n_4$$

When the pump power is much greater than the signal power, which is normal in maser operation, then the equation can be reduced to:

$$(n_5-n_2)=(n_1-n_4)=\frac{N}{5}\frac{h}{kt}\,\frac{\omega_{21}f_{21}-(\omega_{32}f_{32}+\omega_{42}f_{42}+\omega_{52}f_{52})}{\omega_{32}+\omega_{21}+\omega_{52}+W_{52}}$$

By inspection it is sen that $n_5$ is greater than $n_2$, which is the necessary condition for stimulated emission at frequency $f_{52}$, when the transition rate times frequency $\omega_{21}f_{21}$ is greater than $\omega_{32}f_{32}+\omega_{42}f_{42}+\omega_{52}f_{52}$.

If the opposite is true, that $\omega_{21}f_{21}$ is less than $$\omega_{32}f_{32}+\omega_{42}f_{42}+\omega_{52}f_{52}$$

then the population density of state 4 is greater than the population density of the first state and stimulated emission can occur at frequency $f_{41}$, which is still greater than the pump frequency. Thus, the five level maser demonstrated will operate over a considerable range of varying parameters requiring only that $$f_{13}=f_{35}=f_{42}=f_{pump}$$

and that $\omega_{21}f_{21}$ is not exactly equal to $$\omega_{32}f_{32}+\omega_{42}f_{42}+\omega_{52}f_{52}$$

The pumped distribution illustrated in FIG. 2B shows the population density of the fifth state to be greater than the population density of the second state whereby stimulated emission at frequency $f_{signal}$ from the fifth to the second state is attained.

Figure 3:
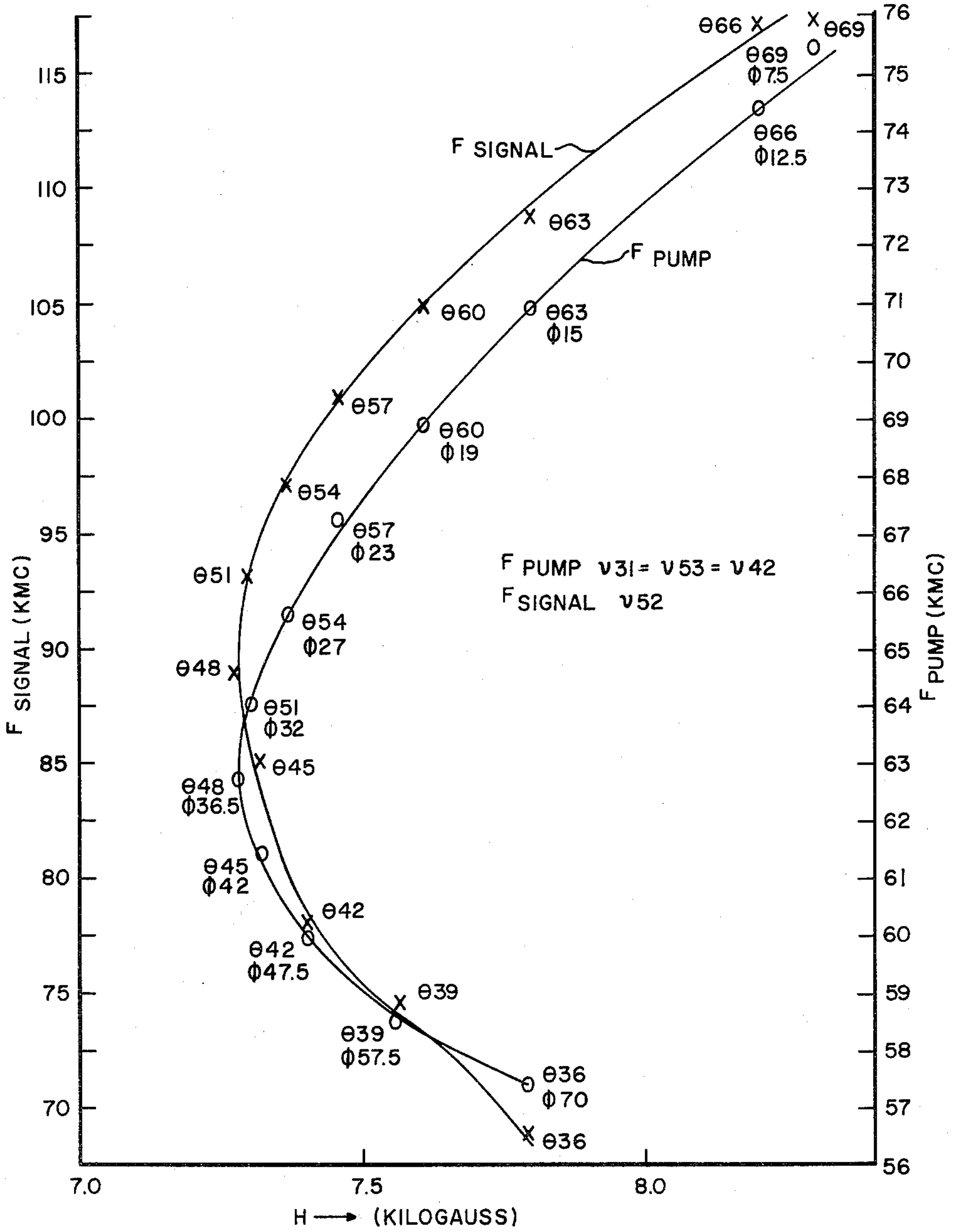
FIG. 3 shows the operating frequency range for a chosen maser material.
Figure 5A:
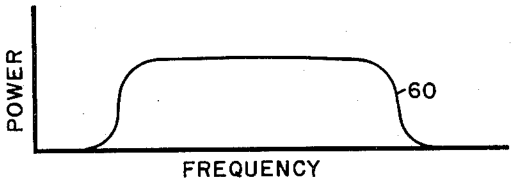
FIG. 5 illustrates performance curves attainable with the illustrative embodiment of FIG. 4.
Figure 5B:
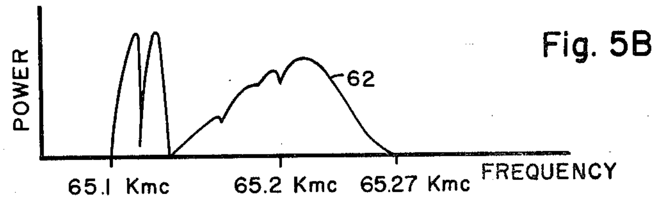
Figure 5C:
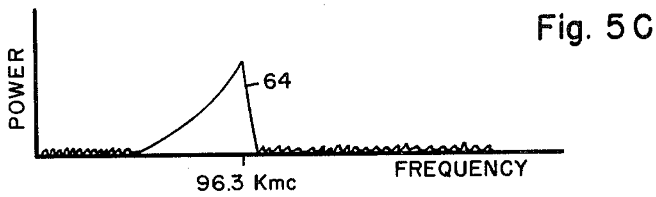
Figure 5D:
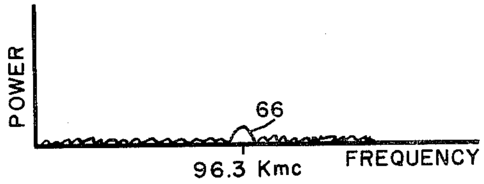
Figure 5E:
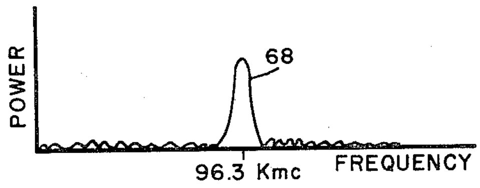

FIG. 3 is a theoretical plot of solutions to the spin Hamiltonian where $f_{13}=f_{42}=f_{53}$. From that figure the signal frequency $f_s$ may be predicted for a given pump frequency $f_p$. By holding the pump frequency $f_p$ and magnetic field H constant the two orientation angles $\phi$ and $\theta$ are determined. For example, assuming a pump frequency of 65.2 kilomegacycles and the physical rotation of the crystal in relation to the magnetic field, as determined by the orientation angles $\theta$ and $\phi$, to have values of $\theta=53°$ and $\phi=28.5°$, the signal frequency $F_S$ can be predicted to be 96.3 kilomegacycles. From the plot of FIG. 3 it can be seen that any chosen pump frequency will have a predictable signal frequency $f_S$ as determined by the angles of orientation $\theta$ and $\phi$.

Since the signal frequency $f_S$ has been selected from

FIGS. 1 and 2 to be equal to $f_{52}$, it is necessary to suppress oscillations at $f_{54}$ and $f_{32}$. Suppression of the unwanted oscillations is readily accomplished by making the cavity small enough to be unable to support the lower frequencies or oscillations. Hence, no high Q resonant cavities at the frequency $f_{32}$ or $f_{54}$ are provided. As mentioned previously, this was accomplished by making the sample material itself small in size.

Figure 4:
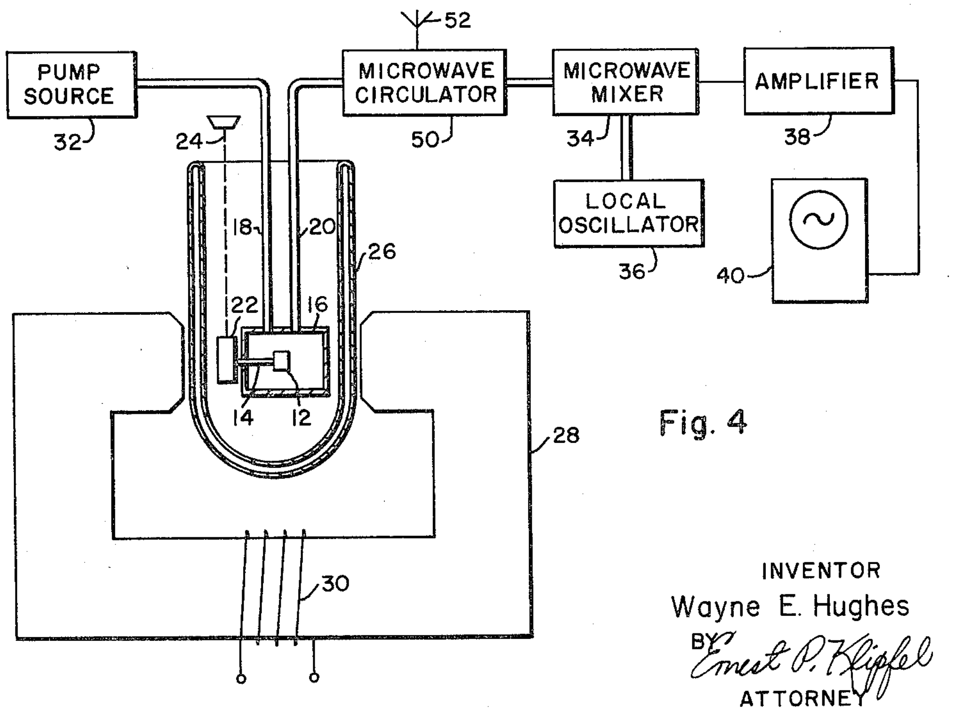
FIG. 4 is a schematic diagram of an illustrative embodiment of a maser in accordance with the present invention.

A schematic diagram of an illustrative embodiment of the present invention and the test apparatus for measuring the results obtained therefrom is shown in FIG. 4. The rutile crystal 12 is of cylindrical configuration 0.04″ long and 0.11″ in diameter, although it is to be understood that any suitable configuration may be used. The crystal was doped with about 0.1% $Fe^{3+}$ ions and was transparent with an orange or yellow color. The ions enter the rutile substantially in a ratio of about $$Fe/Ti=10^{-3}$$

The crystal 12 was fixed to the end of a one millimeter quartz rod 14 and placed in a metal cavity 16 which terminated the pump waveguide 18 and the signal waveguide 20. The quartz rod 14 serves two purposes, one is to keep the sample 12 away from the metal walls of the cavity 16 and the second is to act as a shaft for rotation of the sample 12 about its cylindrical axis. A gear box 22 with linkage 24 controls the orientation angles $\theta$ and $\phi$ by manually positioning the crystal 12 with respect to the magnetic field. A DeWar assembly 26 surrounds the maser cavity 16 maintaining the crystal 12 at a temperature in the range of 2.2 to 4.2 Kelvin degrees. Magnetic means illustrated as the large electromagnetic 28 having input means 30 controls the strength of the magnetic field H. The electromagnet 28 provides a field of homogeneity of very small variation and is necessary to obtain the desired energy level splitting.

A maser pump source 32 such as a klystron provides the pump energy to the maser cavity 16 through the pump waveguide 18. The signal to be amplified is transmitted to the maser material 12 through waveguide 20 by means of the circulator 50 which receives the signal to be amplified at an antenna or signal source 52. The amplified signal from the maser is returned through waveguide 20 through the circulator 50 to the microwave mixer 34. The signal frequency from the waveguide 20 enters the microwave mixer 34 with the output frequency of the local oscillator 36 where it is heterodyned with the local oscillator signal. The intermediate frequency output is amplified at 38 with a resultant output to the oscilloscope 40.

FIG. 5 illustrates the test results obtained from the operation of the typical microwave spectrometer shown schematically in FIG. 4 at a frequency $F_{52}$ of 96.3 kilomegacycles. FIGURE 5A shows the power output 60 versus frequency of the maser pump source 32 swept over a range of approximately 170 megacycles centered at 65.2 kilomegacycles per second. FIG. 5B illustrates the pumped power 62 reflected from the rutile sample 12 and demonstrates the absorption caused by the resonant modes in the rutile sample. FIG. 5C illustrates the output 64 of the maser at 96.3 kilomegacycles when the coupling has been adjusted to allow oscillation at that frequency. A noise level of approximately −30 dbms. can be seen with an oscillation power output at 96.3 kilomegacycles of approximately −20 dbm. FIGS. 5D and 5E illustrate the reflected power at a frequency of 96.3 kilomegacycles when the coupling is adjusted to give gain instead of oscillations. FIG. 5D illustrates the reflected signal power 66 from the maser with the pumped power OFF while FIG. 5E illustrates the reflected signa power 68 from the maser with the pump power ON. It will be noticed that sizable gain in the order of 9 db is attained.

In the five level mode of operation, all the transitions that need to be pumped are at the same frequency, thus they can be investigated easily and independently using one pump frequency. There is no need to design the microwave structure to support modes other than a single pump frequency and a signal frequency. The method does not depend, to any great extent on the concentration of paramagnetic ions, that is there is no critical value of interaction between levels as there is in the harmonic coupling scheme. The allowed mode of operation is simple and is obtained by the following steps:

(1) Select a crystal structure doped with a paramagnetic ion which has five or more energy levels in an external magnetic field.

(2) Design a microwave structure to support modes at the pump and signal frequencies.

(3) Apply a magnetic field with a proper magnitude and direction so that $f_{13}=f_{24}=f_{35}=f_{pump}=f_{ij}$, where $f_{ij}$ is the transition energy between adjacent odd or even numbered levels $i$ and $j$ expressed in cycles per second; and (4) Provide sufficient pump power to saturate the pump transitions.

Although the present invention has been described with a particular degree of exactness for the purposes of illustration, it is to be understood that all alterations, modifications and substitutions within the spirit and scope of the present invention are herein meant to be included. For example, although the invention has been demonstrated in particular with a five level maser pumping scheme, the principle can be applied to an even greater number of levels. For example, $$f_{13}=f_{35}=f_{24}=f_{46}=f_{57} \ldots =f_{pump}$$

where alternate levels are simultaneously pumped to give an even greater signal to pump frequency ratio.

I claim as my invention:

1. In combination, a material having an energy level system of at least five levels, the separation between the first and third, second and fourth, and the third and fifth energy levels being substantially equal; pumping means for substantially equalizing the population density of each energy level of a first group including said first, third and fifth energy levels and for substantially equalizing the population density of each energy level of a second group including the second and fourth energy levels; and means for abstracting from the active material output energy of frequency equal to the frequency separation between an energy level of said first group and an energy level of said second group but greater than said first-mentioned separation.

2. The combination of claim 1 wherein the frequency of the output energy is substantially equal to the frequency separation of the fifth and second energy levels when the population density of the fifth level is greater than the population density of the second level.

3. The combination of claim 1 wherein the frequency of the output energy is substantially equal to the separation of the fourth and first levels when the population density of the second level is greater than the population density of the fifth level.

4. In combination, a material having an energy level system of at least five levels, means for equalizing the transition frequencies between adjacent odd-numbered energy levels and adjacent even-numbered energy levels; means for pumping energy to said active material to saturate said transition frequencies; and means for resonating a transition frequency between an odd-numbered energy level and an even-numbered energy level but greater than said transition frequencies.

5. In combination, a solid having an energy level system of at least five levels; magnetic field means for separating the first and third, second and fourth and third and fifth energy levels by substantially the same magnitude of transition frequency and separating the first and second energy levels with a transition frequency greater than one-half the transition frequency between the first and third energy levels; and means for pumping said solid to invert the population density between the fifth and fourth, third and second and fifth and second energy levels; and means for stimulating emission from the fifth to second energy levels.

6. In combination, a solid having an energy level system of at least five levels; magnetic field means for separating the first and third, second and fourth and third and fifth energy levels by substantially the same magnitude of transition frequency and separating the first and second energy levels with a transition frequency less than one-half the transition frequency between the first and third energy levels; and means for pumping said solid to invert the population density between the fourth and third and second and first energy levels; and means for stimulating emission from the fourth to first energy levels.

References Cited by the Examiner

UNITED STATES PATENTS

| | | | |
|---|---|---|---|
| 2,909,654 | 10/59 | Bloembergen | 330—4 |
| 2,993,176 | 7/61 | Bolef et al. | 330—4 |
| 3,001,142 | 9/61 | Mims | 330—4 |

OTHER REFERENCES

Arams: "Proceedings of the IRE," January 1960, page 108.

Foner et al.: "Journal of Applied Physics," April 1960, pages 742–743.

"Advances in Quantum Electronics," edited by Singer, 1961, Columbia University Press, pp. 553–565 relied on (article by Foner et al.).

ROY LAKE, *Primary Examiner.*